Figure 1:
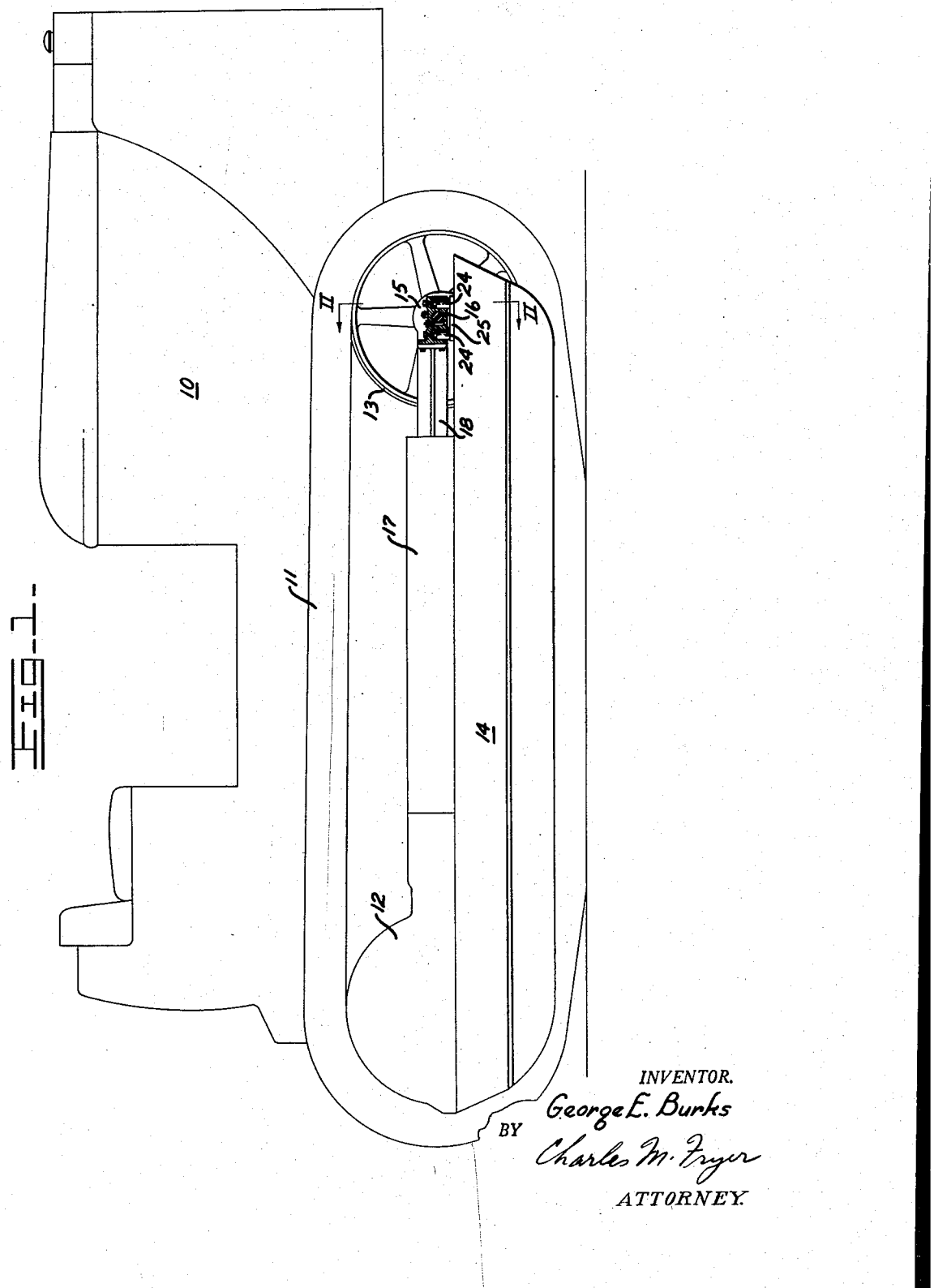

May 3, 1949.　　　G. E. BURKS　　　2,468,957
RESILIENT MOUNTING FOR TRACTOR TRACK IDLERS
Filed Nov. 12, 1946　　　2 Sheets-Sheet 1

INVENTOR.
George E. Burks
BY
Charles M. Fryer
ATTORNEY.

May 3, 1949.  G. E. BURKS  2,468,957
RESILIENT MOUNTING FOR TRACTOR TRACK IDLERS
Filed Nov. 12, 1946  2 Sheets-Sheet 2

INVENTOR.
George E. Burks
BY Charles M. Fryer
ATTORNEY.

Patented May 3, 1949

2,468,957

UNITED STATES PATENT OFFICE 2,468,957

RESILIENT MOUNTING FOR TRACTOR TRACK IDLERS

George E. Burks, Peoria, Ill., assignor to Caterpillar Tractor Co., San Leandro, Calif., a corporation of California Application November 12, 1946, Serial No. 709,269

3 Claims. (Cl. 305—9)

This invention relates to resilient mountings for tractor track idlers and more specifically to a mounting designed to avoid corrosion and blocking of springs conventionally employed for this purpose.

In a tractor of the endless track type, it is customary that the track be trained over an idler and a large driving sprocket. The idler is rotatably supported by bearings carried on the tractor truck frame. These bearings are slidable on the frame and resiliently urged away from the sprocket to maintain the track under tension but to accommodate effective shortening of the track which results from dirt and rocks becoming lodged or packed between the track and the idler and sprocket as it passes over them. The points of connection between the idler bearings and the truck frames include springs to absorb shocks resulting from contact between the track and the ground. As these springs are disposed in close proximity to the ground, they are subjected to the effects of moisture and various materials in which the tractor operates. The moisture tends to cause the springs to rust and mud, rocks and other materials often become packed between the turns of the spring coils to disable them or to place the major portion of the load on one or two coils. This frequently results in breakage of the springs which are difficult and costly to replace.

It is an object of this invention to overcome the disadvantages herein referred to and to provide a resilient mounting for tractor track idlers or the like which adequately protects the springs employed in such mountings and insures that the springs will maintain a uniform degree of resiliency under all operating conditions. Further and more specific objects and advantages of the invention and a clear understanding of the construction in which it is embodied are made apparent in the following specification by reference to the accompanying drawings.

Figure 2:
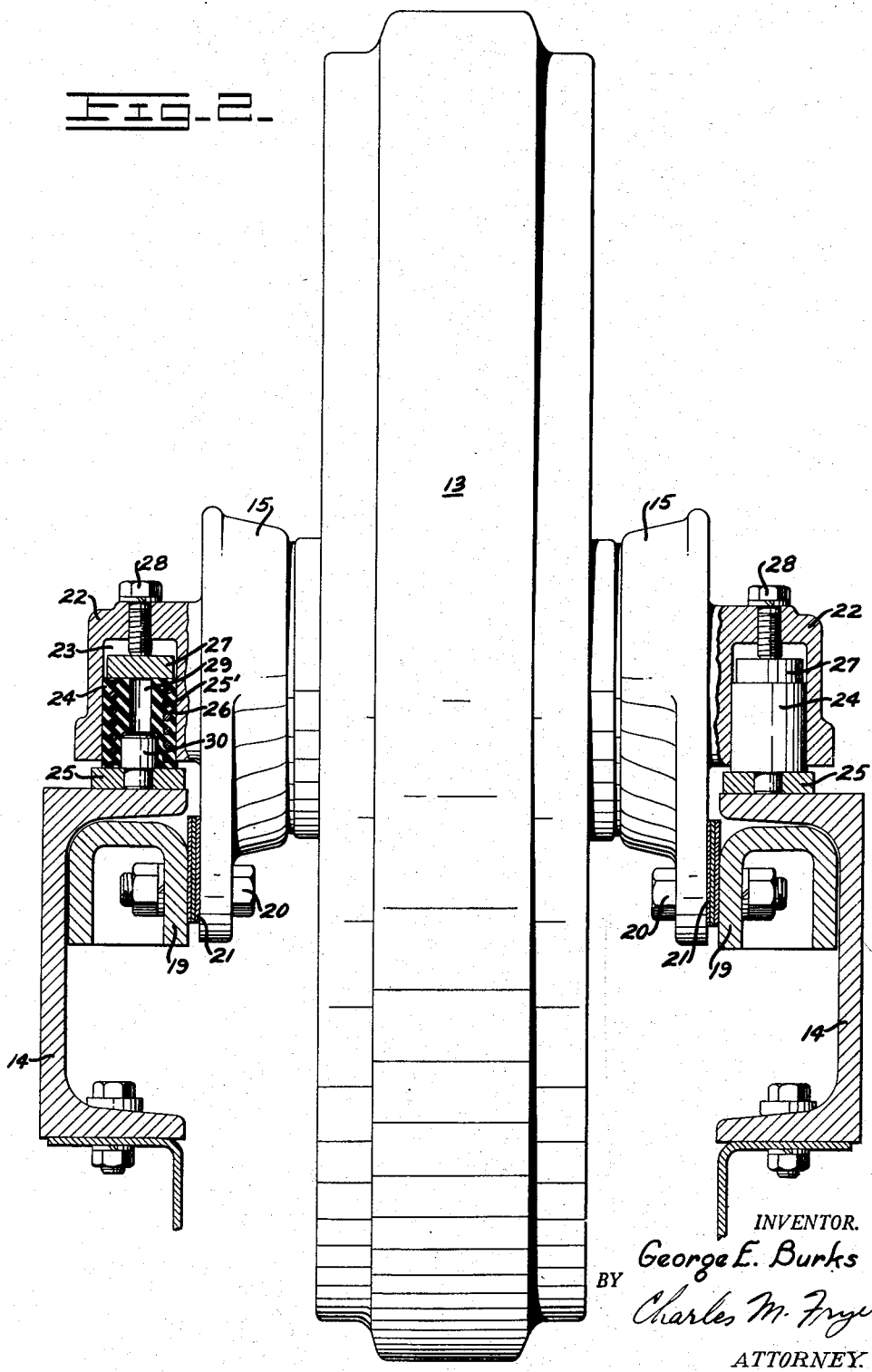

In the drawings:

Fig. 1 is a schematic view in side elevation of a tractor in which one of the front idlers is shown as equipped with a mounting constructed in accordance with the present invention; and Fig. 2 is an enlarged sectional view taken on the line II—II of Fig. 1, illustrating the details of construction of the resilient mounting of the idler.

In Fig. 1 of the drawings, a tractor 10 is diagrammatically illustrated as having endless tracks, one of which is shown at 11. A drive sprocket, not shown, occupies the position indicated at 12 and an idler over which the track passes is shown at 13. Truck frames 14 in the form of spaced channel shaped members, as illustrated in Fig. 2, extend forwardly from the drive sprocket and support bearings 15 adjacent their forward ends. The bearings carry a shaft 16 upon which the idler 13 is supported for rotation. The bearings 15 are mounted for sliding movement longitudinally of the truck frames 14, as will presently appear, and are normally urged forwardly by spring means, not shown, but disposed beneath a cover plate shown at 17 in Fig. 1, and connected with the bearings as by connecting members illustrated at 18. This means of mounting the track idler 13 is conventional and is employed for the purpose of permitting it to slide rearwardly in the event that the material in which the tractor is operating becomes lodged between the track and the drive sprocket of the idler, the spring means being for the purpose of relieving the tension that is exerted on the track under such operating conditions.

The manner in which the idler bearings 15 are supported for sliding movement relative to the truck frames 14 is shown in Fig. 2 where each of the bearing members 15 is illustrated as provided with a guide block 19 secured to it as by bolts 20, and adjustably positioned as by shims 21 to ride beneath the upper leg of the adjacent truck frame channel member 14. Each of the bearings 15 also carries an extension 22 disposed above the upper leg of the channel 14. Each extension 22 is provided with a pair of downwardly opening cylindrical recesses 23 adapted to receive resilient means 24. The resilient elements 24 rest at their lower ends upon a shoe 25 disposed for sliding movement on top of one of the truck frame channels 14.

It is to the construction of the resilient members 24 that the present invention is directed and particularly to the protection of a coil spring 25' which forms a part of each of the resilient members. As illustrated in Fig. 2 in connection with the left hand bearing 15 therein shown, the coil 25' is imbedded in a cylindrical block 26 of pliable material such as rubber or the like, the diameter of which is such that it completely fills the lower portion of the downwardly opening cylindrical recess 23. The lower end of the block 26 bears upon the top surface of the shoe 25 and its upper end engages an adjustable disk 27, the position of which in the upper portion of the recess 23 is determined by an adjusting screw 28 extending through and accessible from the top of the projection 22. The pliable block 26 is provided with a concentrically disposed cylindrical passage 29 throughout its length. The lower portion of this passage is preferably somewhat enlarged and serves to receive a pilot stud 30 carried by and extending upwardly from the shoe 25. The shoe is, of course, provided with such a stud for reception of each of the resilient members supported by it and the studs serve to retain the shoe in its proper position with relation to the truck frame channel 14 upon which it slides. The central passage 29 in the resilient block also affords space for its expansion when it is compressed due to the shock loads absorbed by it and by the spring about which it is formed. Thus, while the block 26 completely occupies the cylindrical recess 23 to prevent the entry of moisture and particles of foreign material into the vicinity of the resilient mounting, it is free to flex inwardly because its central passage accommodates lateral expansion of the pliable material resulting from its compression in a vertical or longitudinal direction.

In assembly the adjusting screws 28 are retracted to permit the resilient members 24 and disks 27 to be received entirely within the recesses 23. In this condition the bearing 15 can be assembled into proper position with relation to the truck frames 14 without interference by the resilient elements. After assembly the screws 28 are tightened to assume the position shown in Fig. 2 to effect sufficient compression of the resilient elements.

While the invention herein disclosed is described in connection with its application to the mounting of idler bearings in a track type tractor, it is, of course, to be understood that it is not limited in use to this specific environment but may be employed in conjunction with the resilient mounting of other movable members where it is desirable to protect a spring against the effect of moisture and dirt.

I claim:

1. A resilient mounting for a tractor track idler which includes idler bearings overlying a truck frame comprising slidable shoes resting on the truck frame, springs interposed between the shoes and the idler bearings, said bearings having downwardly opening recesses to receive said springs, and pliable blocks encasing the springs and substantially filling said recesses.

2. A resilient mounting for a tractor track idler which includes idler bearings overlying a truck frame comprising slidable shoes resting on the truck frame, springs interposed between the shoes and the idler bearings, said bearings having downwardly opening recesses to receive said springs, and pliable blocks encasing the springs and substantially filling said recesses, each of said blocks having a central passage, and pilot studs carried by the shoes and received by said passages.

3. A resilient mounting for a tractor track idler which includes idler bearings overlying a truck frame comprising slidable shoes resting on the truck frame, springs interposed between the shoes and the idler bearings, said bearings having downwardly opening recesses to receive said springs, pliable blocks encasing the springs and substantially filling said recesses, and adjusting means extending into the upper ends of the recesses to adjust the springs.

GEORGE E. BURKS.

REFERENCES CITED

The following references are of record in the file of this patent:

UNITED STATES PATENTS

| Number | Name | Date |
| --- | --- | --- |
| 1,032,454 | Wainwright | July 16, 1912 |
| 1,035,339 | Fox | Aug. 13, 1912 |
| 1,463,366 | Leake | July 31, 1923 |
| 1,571,628 | Hendrickson | Feb. 2, 1926 |
| 1,661,177 | Hamilton | Mar. 6, 1928 |
| 1,824,086 | Knox | Sept. 22, 1931 |

FOREIGN PATENTS

| Number | Country | Date |
| --- | --- | --- |
| 497,008 | Great Britain | Dec. 5, 1938 |